No. 624,565. Patented May 9, 1899.
R. C. STEWART, Jr. & W. A. STEWART.
JAIL.
(Application filed Feb. 1, 1899.)
(No Model.) 3 Sheets—Sheet 1.
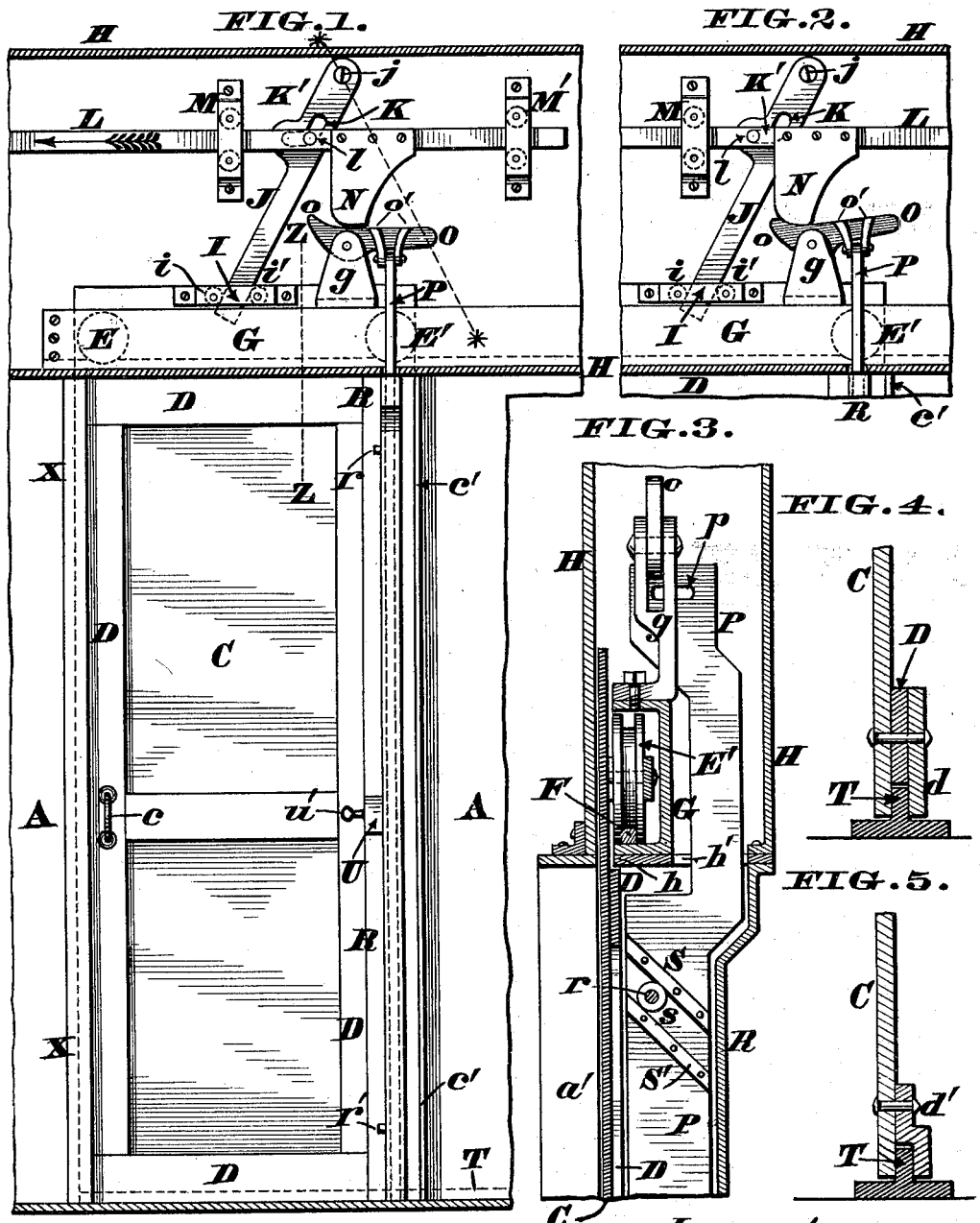

No. 624,565. Patented May 9, 1899.
R. C. STEWART, Jr. & W. A. STEWART.
JAIL.
(Application filed Feb. 1, 1899.)
(No Model.) 3 Sheets—Sheet 2.
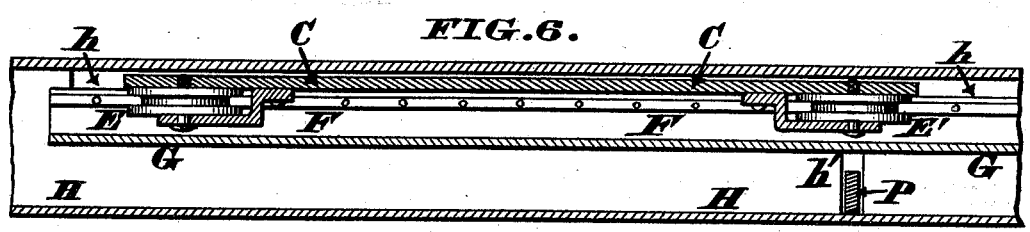
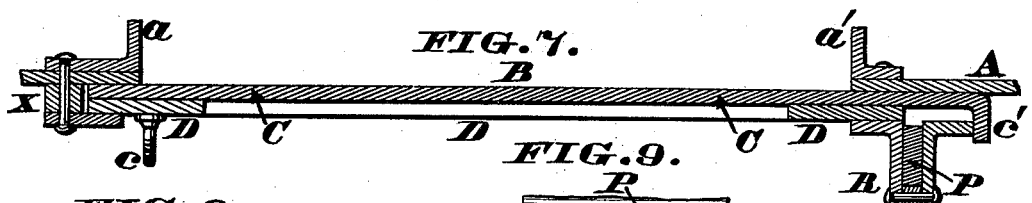
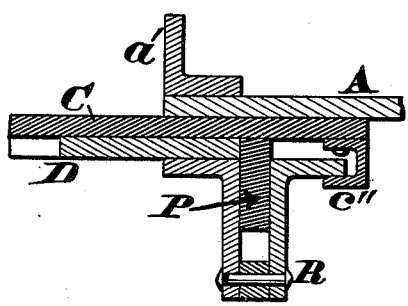
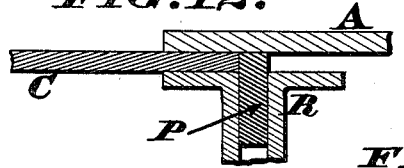
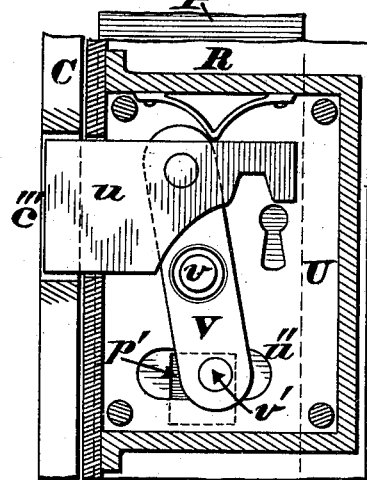
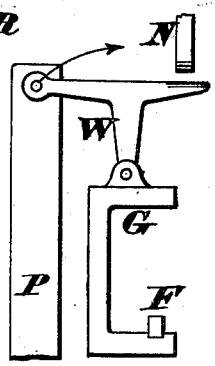
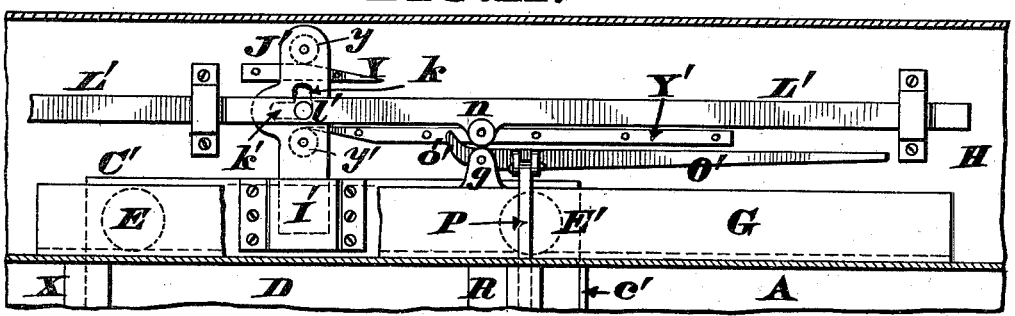
Attest.
Inventors.
Richard C. Stewart, Jr.
Wallace A. Stewart
by James H. Layman.
Atty.

No. 624,565. Patented May 9, 1899.
R. C. STEWART, Jr. & W. A. STEWART.
JAIL.
(Application filed Feb. 1, 1899.)
(No Model.) 3 Sheets—Sheet 3.
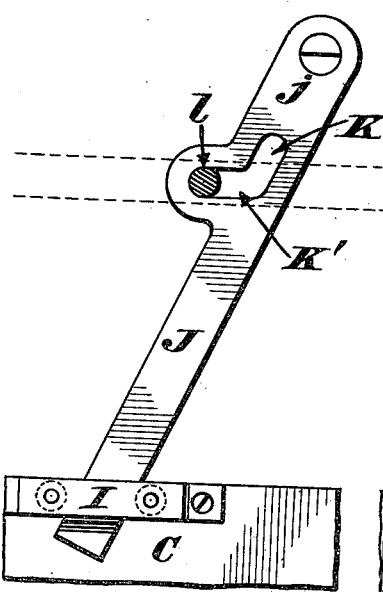
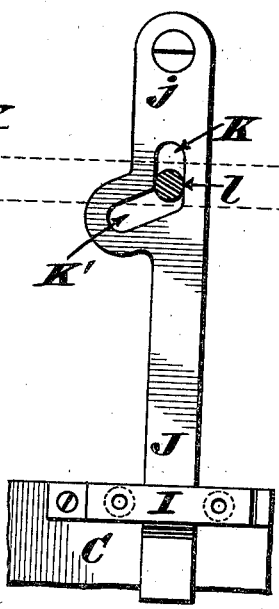
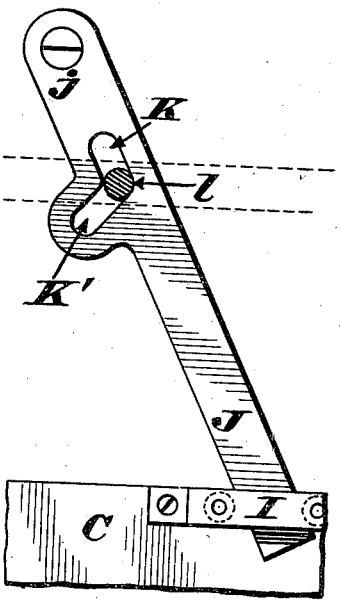
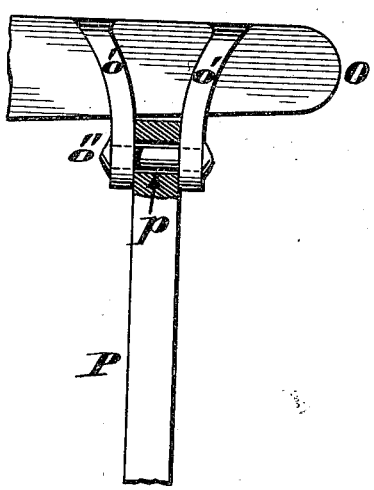
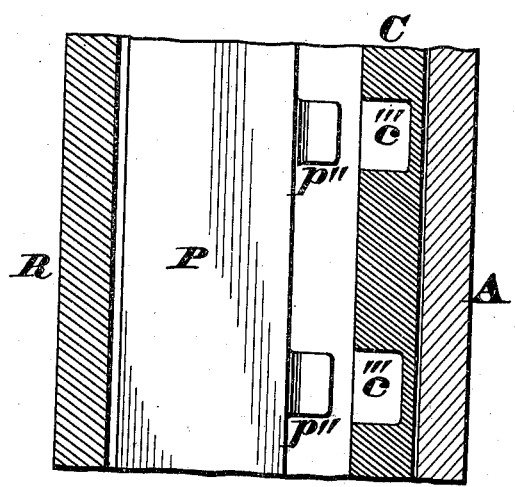

UNITED STATES PATENT OFFICE.

RICHARD C. STEWART, JR., AND WALLACE A. STEWART, OF COVINGTON, KENTUCKY.

JAIL.

SPECIFICATION forming part of Letters Patent No. 624,565, dated May 9, 1899.

Application filed February 1, 1899. Serial No. 704,092. (No model.)

*To all whom it may concern:*

Be it known that we, RICHARD C. STEWART, Jr., and WALLACE A. STEWART, citizens of the United States, residing at Covington, in the county of Kenton and State of Kentucky, have invented certain new and useful Improvements in Jails; and we do hereby declare the following to be a full, clear, and exact description of the invention, reference being had to the annexed drawings, which form a part of this specification.

This invention relates to those jails, prisons, and other similar houses of detention having cells provided with laterally-sliding doors made either of solid plates or of gratings; and our principal improvement comprises a novel construction of mechanism that performs the two-fold duties of first unlocking a door and then shifting it aside to a wide-open position, or, reversing the operation, the door is first shifted aside to a closed position and then securely locked. This mechanism includes, primarily, a longitudinally-shiftable bar for each door, which bar can be operated only by a jailer or other officer or guard stationed outside a common passage or corridor with which a number of cell-doors communicate, and when said bar is moved in one direction a trip rigidly projecting from it depresses one end of a lever pivoted to a fixture near the top of the door. This lever has coupled to it a lock-bar proper arranged vertically within a housing in front of a cell and near what is usually the hinge side of a door. Normally this vertical bar bears against the edge of the door and effectually resists any clandestine attempt to force it aside; but when the lever is depressed, as above described, said bar is shifted laterally so far away from the door as to unlock it and permit it being slid along on overhead suspension devices. This opening of the door, which occurs immediately after it is unlocked, is effected by a still further movement of the longitudinally-shiftable bar, which now actuates another lever having its lower end engaged with said door and its other end pivoted to a fixture of the cell with which the door communicates. Furthermore, all the above-described operating devices are securely concealed within a special casing arranged above the cell-doors and extending the entire length of the prisoners' corridor, as hereinafter more fully described.

Another but minor feature of our improvements consists in so constructing this lock-bar as to enable it to retract a bolt of a special lock used only for temporarily fastening a door, as hereinafter more fully described.

In the annexed drawings, Figure 1 is a front elevation of a portion of a cell provided with our door-operating mechanism, the door being closed, but not locked, and the casing inclosing said mechanism being sectioned vertically. Fig. 2 is an elevation of enough of said mechanism to show it shifted to a position where the lock-bar securely fastens the door. Fig. 3 is an enlarged vertical section through the casing and the upper part of the door, said section being taken at the line $z\ z$ of Fig. 1 and looking toward the lock-bar and its connections. Fig. 4 is an enlarged vertical section through the lower part of the door and the rail that guides it. Fig. 5 is a similar section of a modification of this part of the door. Fig. 6 is an enlarged horizontal section of the upper part of the door, taken in the plane of its suspension-rollers. Fig. 7 is another similar section of the door, taken in the plane of its handle, the lock-bar being retracted to permit of said door being opened. Fig. 8 is a horizontal section through one side of the door, the lock-bar being now advanced to fasten said door. Fig. 9 is a vertical section showing the bolt of the special lock engaged with the door. Figs. 10, 11, and 12 show three different modifications of the invention. Figs. 13, 14, and 15 are diagrams showing, on an enlarged scale, three different positions of the door-operating lever. In these diagrams the shiftable bar that actuates said lever is shown by dotted lines, and a stud that projects from said bar and traverses an angular slot of said lever is sectioned. Fig. 16 shows, on an enlarged scale, the devices wherewith the lock-bar is coupled to its operating-lever. Fig. 17 shows a modification of the locking appliances.

A represents the front of a cell, and $a\ a'$ in Fig. 7 are angle-irons forming the jambs at the opposite sides of the opening B of said cell, which opening is closed with the laterally-sliding door C, here shown as being a single plate of metal stiffened with side and end battens D; but said door can be composed of bars crossed in any desired manner. $c$ is a handle wherewith the door is opened and closed when the shifting mechanism is rendered inoperative, said door being suspended from rollers E E', running upon a track F, fastened longitudinally of a channel-iron G. Channel-iron G is secured to the bottom plate of a casing H, arranged above the cells and projecting out into the corridor with which their doors communicate. Again, this bottom plate of the casing is slotted longitudinally, as shown at $h$ in Figs. 3 and 6, to permit the door being run aside from right to left, said door being provided near its top with a box-strap I, having usually a pair of antifriction-rollers $i$ $i'$ journaled in it. Fitting snugly between these rollers is the lower end of a lever J, whose upper end is pivoted at $j$ to the casing H, the lever being provided with a short longitudinal slot K, communicating at its lower end with a short transverse slot K', these slots being traversed by a stud $l$, projecting laterally from the rear side of the longitudinally-shiftable bar L. This bar travels within guides M M' and may be moved back and forth by any convenient means; but preferably it is operated by the peculiar mechanism shown in Letters Patent No. 584,610, granted to us June 15, 1897. Projecting down from this bar is a trip N, adapted at the proper moment to impinge against the upwardly-curved end $o$ of a short lever O, pivoted in a standard $g$, projecting vertically from the channel-iron G. Lever O has a pair of ears $o'$, traversed by a pin $o''$, that also passes through a transverse slot $p$ near the upper end of the lock-bar P, as shown in Fig. 16. This bar is adapted to play back and forth and up and down within a transverse slot $h'$ of the casing and is fitted for the greater portion of its length within a housing R, whose upper end is fastened to the casing H, while its lower end is secured to the corridor-floor. In order to permit the proper motion of said bar, it has secured to its side a pair of inclined guides S S', (shown in Fig. 3,) which guides run upon a roller $s$, journaled on a stud-shaft $r$, fastened to the housing R. $r'$ in Fig. 1 is another stud-shaft for the support of a lower roller, a pair of them being sufficient for all ordinary-sized lock-bars.

The bottom of the door is confined to a proper path by a rail T, (shown in Fig. 4,) which rail is located directly under the lower batten D, to which is riveted an outer plate $d$; but in Fig. 5 a bent plate $d'$ is arranged to grasp said rail. Again, in Figs. 1, 7, and 11 the lock edge of the door C has an outwardly-bent integral flange $c'$, that fits up tightly against the housing R when said door is completely closed; but in Fig. 8 the door has secured to it a channel-iron $c''$, that fits around this edge of the housing.

U in Fig. 9 is a lock-case secured to the side of housing R and having a bolt $u$, capable of being thrown by a key $u'$, as shown in Fig. 1, so as to engage with a hole $c'''$ of the door C, the bolt having pivoted to it the upper end of a lever V, pivoted within said case at $v$. Projecting laterally from near the lower end of this lever is a short stud $v'$, which, after passing through a slot $u''$ of the lock-case, enters a recess $p'$, cut in the side of lock-bar P.

X is a casing within which fits the handle side of the door.

The operation of our door-shifting and unlocking mechanism is as follows: When the door is shoved wide open by simply shifting the bar L to the right, the lever J hangs about at the angle shown in diagram 15 and indicated by the dotted line * * in Fig. 1, and the stud $l$ of the operating-bar L is now situated at the bend of the angular slot K K' of said lever, and at the same time the lock-bar P is free to gravitate down within the housing R and occupy the position shown in Figs. 1, 3, 6, and 7. To close the door, the bar L is by any suitable means shifted in the direction of the arrow shown in Fig. 1, and as long as the stud $l$ traverses slot K' the motion of said bar is transferred to the lever J and from the latter to said door. Consequently the door is slid over toward the casing X, and by the time its advancing side is fairly housed within said casing the lever J is so inclined as to render the slot K' about horizontal, as more clearly shown in diagram 13, and thereby prevent any further swing of said lever. Up to this moment the trip N has been inoperative; but a slightly-further advance of the bar L carries its lug $l$ along to the front end of the slot K' of the lever J, as shown in Fig. 2 and diagram 13. This travel of the stud within the slot K' is quite limited, but is sufficient to bring the trip N in contact with the upcurved end $o$ of lever O, thereby rocking it and elevating the end to which is coupled the lock-bar P. Now as the guides S S' are inclined in the direction shown in Fig. 3 it is evident that any raising of the lock-bar must cause its lateral shifting toward the door, and by the time said bar has been elevated as far as the lever O can carry it said door is securely fastened. This fastening is due to the fact that the bar P is now in close contact with the edge of the door-batten D, as shown in Fig. 8. Hence it is evident the door will remain securely locked until the bar P is shoved back within the casing R; but as said bar is inaccessible from all sides and as the shifting bar L is concealed within the casing H and as all the movements of said bar are under the absolute control of the jailer or other guard any clandestine opening of the door is impossible. As soon, however, as the officer on guard shifts back the bar L the trip N forces the lever O down to its normal horizontal position and allows the bar R to gravitate forward as far as the housing P will permit. (See Fig. 7.) The bar L has to travel only the distance of the slot K' of lever J to enable this shifting of the lock-bar to take place, and as soon as the stud $l$ of said bar L reaches the bend of said slot said lever is forced back, carrying the door along with it, which opening is readily effected because the bar P no longer bears against the edge of the door-batten. When the door has been slid wide open, the lever J again reaches the position of the dotted line * *, and the stud *l* once more occupies the bend of the angular slot K K' of said lever, after which act the previously-described shutting and locking operations can be repeated.

It may be necessary in some emergencies to secure an unruly prisoner in a cell at once and without taking time to run to the end of the corridor to operate the mechanism that controls the shiftable rod L. In such a case after the prisoner has been thrust into the cell the door is drawn over to a closed position and is locked by simply throwing the bolt *u* and causing it to engage with the hole or socket *c'''* of said door. (See Fig. 9.) Having done this, time can be taken to operate the devices for advancing the rod L and bringing the lock-bar P into action, and as this latter bar P moves over toward the cell front to lock the door the side of groove *p'* comes in contact with the stud *v'* and at once retracts the bolt *u* within the case W. It will thus be seen that this special lock can be used only when the lock-bar P is out of service and is automatically rendered inoperative when said bar serves as the door-fastening.

The above is a description of the preferred construction of our mechanism; but the details of the same can be varied to suit circumstances—as, for example, in Fig. 10, where a rocker W is mounted upon the channel-iron G, so as to swing over in the direction of the arrow when depressed by the trip N. Evidently this action of the rocker will impart the desired motion to the lock-bar P. Again, there are many jails and prisons where it is impossible to have sufficient room within the casing H for the long lever J to swing in, and in such an event the modification shown in Fig. 11 can be used. Here a swinging lever is dispensed with and a vertically-reciprocating coupler J is employed for transferring the motion of the shifting rod L' to the door C'. Coupler J' has slots *k k'*, arranged like the slots K K' of lever J, and the lower end of said coupler engages with a box-strap I', secured to the door. Again, this coupler has rollers *y y'*, adapted to travel along the tracks Y Y', secured to the casing, and thereby at the proper moment cause said coupler to shift up and down in order that the stud *l'* of rod L' may be caused to enter the slot *k* or *k'*. Rod L' carries a roller *n*, which by contacting with the upwardly-bent end *o''* of a lever O' so operates the latter as to impart the desired motion to the lock-bar P. Finally, in the drawings this lock-bar has been shown as bearing against the concealed edge of a batten D when the door is closed and fastened. This construction is preferred because the edge of the batten affords somewhat of an extended surface for the bar to bear against; but practically the same result would be produced by permitting the said bar to bear against the edge of the door, as shown in Fig. 12; but this construction will not permit the use of either of the guards *c'* or *c''*, and it is preferred to employ one of these guards on every door. Again, these guards will not be needed provided the effective edge of the lock-bar is armed with a series of lugs or pins *p''*, capable of entering a corresponding number of holes or sockets *c'''* in the front of the door and near its edge, as shown in Fig. 17. Finally, diagram 14 shows the need of the longitudinal portion K of the angular slot in the lever J—that is to say, this portion of said slot is necessary to admit the stud *l* when said lever reaches a vertical position both in its forward and backward swing.

We claim as our invention—

1. A laterally-sliding jail-door, a laterally-sliding lock-bar, and mechanism that first closes said door, and then fastens it by shifting said lock-bar, in the manner described.

2. A laterally-sliding jail-door, a laterally-sliding lock-bar a longitudinally-shiftable bar, and intermediate devices whereby the movement of said shiftable bar closes said door, and then fastens it by advancing said lock-bar in the manner described.

3. A laterally-sliding jail-door, a laterally-sliding lock-bar, a longitudinally-shiftable bar, a swinging lever coupled to said door and to said longitudinally-shiftable bar, and a trip device for operating said lock-bar, in the manner described.

4. A laterally-sliding jail-door, a laterally-sliding lock-bar P, a longitudinally-shiftable bar L, having a stud *l*, and trip N; a swinging lever J, having its free end coupled to said door, and provided with communicating slots K, K', traversed by said stud *l*; and a lever O, pivoted to a fixture near the top of said door, and having said lock-bar P coupled to it, in the manner described.

5. In a jail-door-operating mechanism, of the class specified, an elevated casing, a channel-iron G secured therein, a track F, fastened to the lower flange of said iron, and a door having rollers or wheels E, E', that travel along said track, in the manner described.

6. A laterally-sliding jail-door having an opening or recess *c'''*; a housing R, a lock-bar P, laterally shiftable within said housing, and having an opening or recess *p'*; a lock-case secured to said housing and slotted at *u''*; a bolt *u* reciprocating within said case, and adapted to be advanced by a key; and a pivoted lever V, coupled to said bolt and provided with a stud *v'*, that traverses the slot *u''*, and enters the opening or recess *p'* of said lock-bar, for the purpose described.

In testimony whereof we affix our signatures in presence of two witnesses.

RICHARD C. STEWART, JR.
WALLACE A. STEWART.

Witnesses:
JAMES H. LAYMAN,
SPENCER M. JONES.